(12) United States Patent
Sasaki et al.

(10) Patent No.: US 11,468,724 B2
(45) Date of Patent: Oct. 11, 2022

(54) CONTROL APPARATUS, SYSTEM, STORAGE, AND SERVICE PROVISION METHOD

(71) Applicant: TOYOTA JIDOSHA KABUSHIKI KAISHA, Toyota (JP)

(72) Inventors: Akira Sasaki, Miyoshi (JP); Manabu Ishihara, Nagoya (JP); Toshiki Kashiwakura, Ota-ku Tokyo-to (JP); Evan Vijithakumara, Frisco, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/518,848

(22) Filed: Nov. 4, 2021

(65) Prior Publication Data
US 2022/0148355 A1 May 12, 2022

(30) Foreign Application Priority Data

Nov. 6, 2020 (JP) .............................. JP2020-185965

(51) Int. Cl.
  *G07C 9/00* (2020.01)
  *A47G 29/30* (2006.01)
  *H04W 4/029* (2018.01)

(52) U.S. Cl.
  CPC ......... *G07C 9/00912* (2013.01); *A47G 29/30* (2013.01); *G07C 9/00658* (2013.01); *H04W 4/029* (2018.02)

(58) Field of Classification Search
  CPC ............ G07C 9/00912; G07C 9/00658; A47G 29/30; H04W 4/029
  See application file for complete search history.

(56) References Cited

U.S. PATENT DOCUMENTS

| | | | |
|---|---|---|---|
| 10,769,712 B1* | 9/2020 | Edwards | G06Q 30/0635 |
| 10,921,147 B1* | 2/2021 | Hapgood | G06Q 10/06311 |
| 2020/0258139 A1* | 8/2020 | Chen | G06Q 30/0208 |
| 2020/0293989 A1* | 9/2020 | Son | H04W 4/025 |
| 2021/0216959 A1* | 7/2021 | Hapgood | G06Q 30/0639 |
| 2021/0326966 A1* | 10/2021 | DeLuca | G06Q 10/0836 |
| 2022/0148355 A1* | 5/2022 | Sasaki | G07C 9/00658 |

FOREIGN PATENT DOCUMENTS

JP  2004-341684 A  12/2004

* cited by examiner

*Primary Examiner* — An T Nguyen
(74) *Attorney, Agent, or Firm* — Dinsmore & Shohl LLP

(57) ABSTRACT

A control apparatus includes a controller configured to generate an electronic key for unlocking a storage configured to be locked with an article stored therein, and a communication interface configured to transmit the electronic key generated by the controller to a terminal apparatus of a user in a case in which the user is forecasted to arrive at a store after a time slot for providing the article at the store has passed.

20 Claims, 7 Drawing Sheets

CONTROL APPARATUS, SYSTEM, STORAGE, AND SERVICE PROVISION METHOD

CROSS-REFERENCE TO RELATED APPLICATION

This application claims priority to Japanese Patent Application No. 2020-185965, filed on Nov. 6, 2020, the entire contents of which are incorporated herein by reference.

TECHNICAL FIELD

The present disclosure relates to a control apparatus, a system, a storage, and a service provision method.

BACKGROUND

Patent Literature (PTL) 1 discloses a method in which a provision preparation start range that depends on the traveling speed of a user is set, and preparation of a product or a service to be provided to the user is started at the timing when the user enters the range.

CITATION LIST

Patent Literature

PTL 1: JP 2004-341684 A

SUMMARY

In the method disclosed in PTL 1, articles cannot be provided to users after a time slot for providing the articles at a store has passed, such as a closing time.

It would be helpful to enable provision of articles to users even after a time slot for providing the articles at a store has passed.

A control apparatus according to the present disclosure includes:

a controller configured to generate an electronic key for unlocking a storage configured to be locked with an article stored therein; and a communication interface configured to transmit the electronic key generated by the controller to a terminal apparatus of a user in a case in which the user is forecasted to arrive at a store after a time slot for providing the article at the store has passed.

A service provision method according to the present disclosure includes:

generating, by a control apparatus, an electronic key for unlocking a storage configured to be locked with an article stored therein; and transmitting the generated electronic key from the control apparatus to a terminal apparatus of a user in a case in which the user is forecasted to arrive at a store after a time slot for providing the article at the store has passed.

According to the present disclosure, it is possible to provide articles to users even after a time slot for providing the articles at a store has passed.

DETAILED DESCRIPTION

Figure 1:
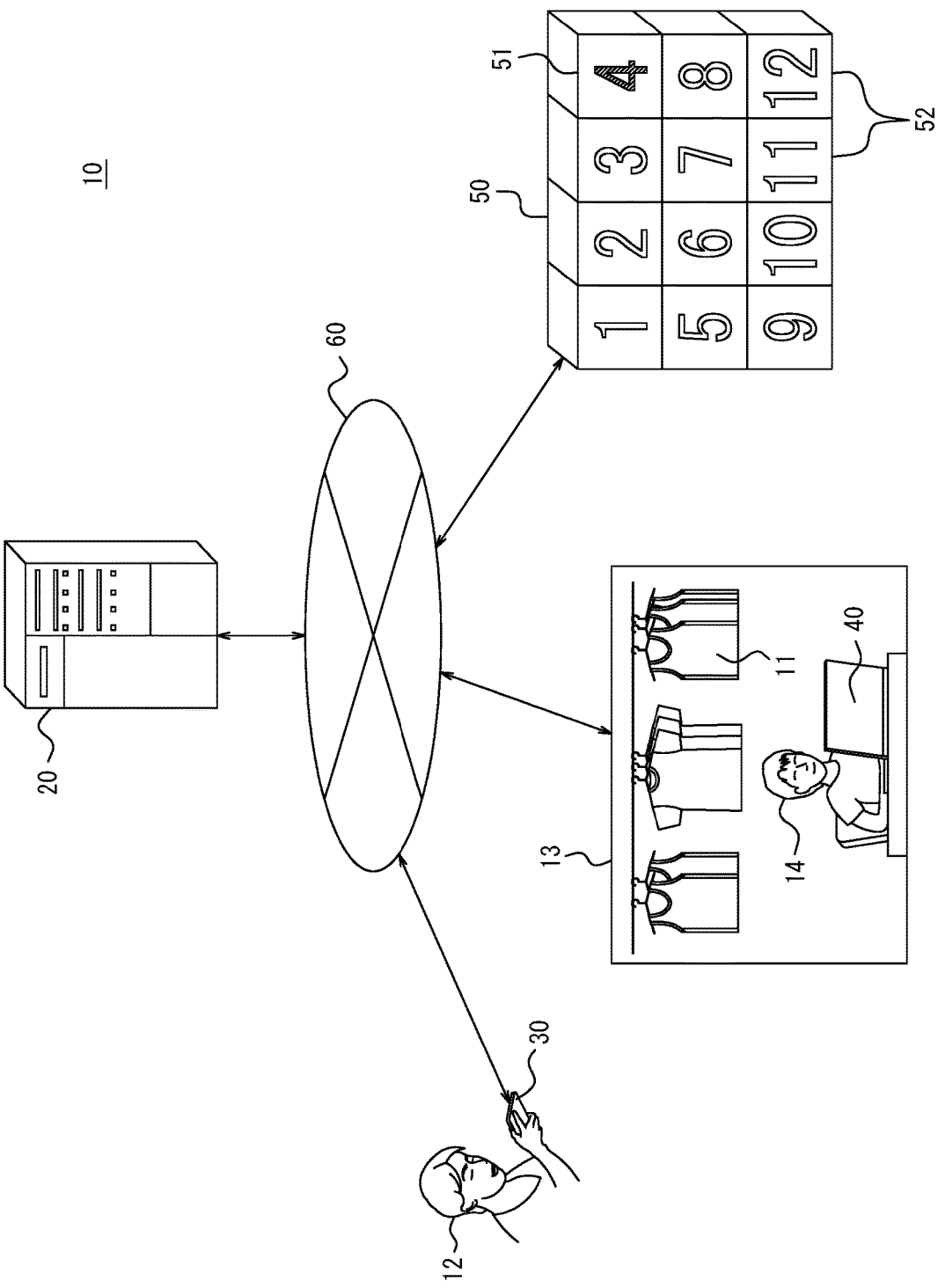
FIG. 1 is a diagram illustrating a configuration of a system according to a first embodiment of the present disclosure.

Hereinafter, some embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified, as appropriate.

A first embodiment, an embodiment of the present disclosure, will be described.

A configuration of a system 10 according to the present embodiment will be described with reference to FIG. 1.

The system 10 according to the present embodiment includes at least one control apparatus 20, at least one first terminal apparatus 30, at least one second terminal apparatus 40, and at least one storage 50. The control apparatus 20 can communicate with the first terminal apparatus 30, the second terminal apparatus 40, and the storage 50 via a network 60. The first terminal apparatus 30 may be able to communicate with the second terminal apparatus 40 and the storage 50 via the network 60. The second terminal apparatus 40 may be able to communicate with the storage 50 via the network 60.

The control apparatus 20 is installed in a facility such as a data center. The control apparatus 20 is a computer such as a server that belongs to a cloud computing system or another type of computing system.

The first terminal apparatus 30 is held by a user 12 who orders articles 11, and used by the user 12. The articles 11 are, for example, food, beverages, commodities, miscellaneous goods, clothing, sporting goods, toys, books, or auto supplies. The first terminal apparatus 30 is, for example, a mobile device such as a mobile phone, a smartphone, or a tablet.

The second terminal apparatus 40 is installed in a store 13 that provides the articles 11 to the user 12 in the present embodiment, but may be held by a clerk 14 of the store 13. The second terminal apparatus 40 is used by the clerk 14. The store 13 is, for example, a restaurant, a fast food store, a convenience store, a discount store, a supermarket, a department store, a clothing store, a sporting goods store, a toy store, a bookstore, or an auto supply store. The second terminal apparatus 40 is, for example, a mobile device such as a mobile phone, a smartphone, or a tablet, a PC, or a dedicated device of the store 13. The term "PC" is an abbreviation of personal computer.

The storage 50 is installed outside the store 13 in the present embodiment, but may be installed inside the store 13 in such a manner that the storage 50 can be used even after the store 13 is closed. The storage 50 is locked by the clerk 14 with an article 11 stored therein, and unlocked by the user 12 using an electronic key D1. The storage 50 has two or more storage compartments 52 to be locked individually in the present embodiment, but may have only one storage compartment 51 in which the article 11 is to be stored. Each storage compartment 52 is, for example, a storage box with a door.

In the present embodiment, the two or more storage compartments 52 of the storage 50 have different appearances from each other. Specifically, a unique identifier is displayed on the front surface of each storage compartment 52. The identifier is, for example, a number such as "1", "2", "3", or "4".

In the present embodiment, the two or more storage compartments 52 of the storage 50 have a function of emitting light individually. Specifically, lighting is installed on the front surface of each storage compartment 52. The lighting is, for example, a plurality of LEDs arranged to fit the shape of the corresponding number displayed on the front surface of each storage compartment 52. The term "LED" is an abbreviation of light emitting diode.

The network 60 includes the Internet, at least one WAN, at least one MAN, or any combination thereof. The term "WAN" is an abbreviation of wide area network. The term "MAN" is an abbreviation of metropolitan area network. The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The control apparatus 20 generates an electronic key D1 for unlocking the storage 50, which is to be locked with an article 11 stored therein. The control apparatus 20 transmits the generated electronic key D1 to the first terminal apparatus 30 of the user 12 in a case in which the user 12 is forecasted to arrive at the store 13 after a time slot for providing the article 11 at the store 13 has passed. Therefore, according to the present embodiment, it is possible to provide the article 11 to the user 12 even after the time slot for providing the article 11 at the store 13 has passed.

Figure 2:
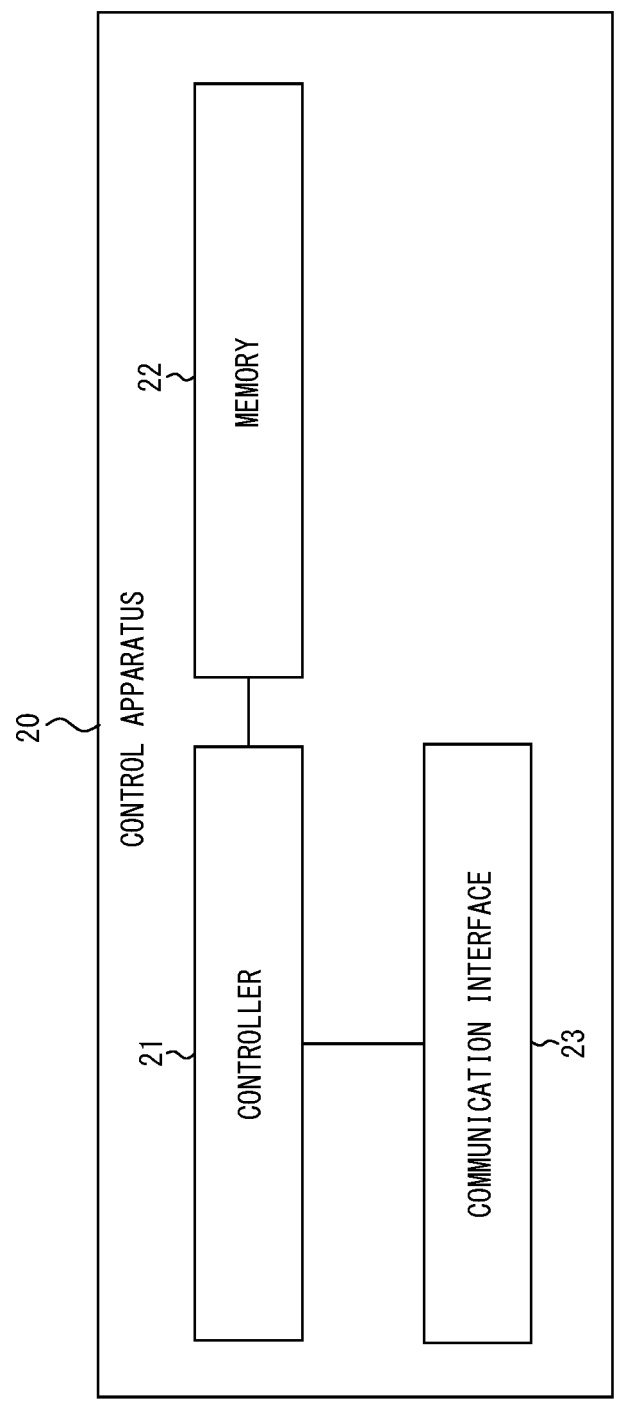
FIG. 2 is a block diagram illustrating a configuration of a control apparatus according to the first embodiment of the present disclosure.

A configuration of the control apparatus 20 according to the present embodiment will be described with reference to FIG. 2.

The control apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit.

The controller 21 executes processes related to operations of the control apparatus 20 while controlling components of the control apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The functions of the control apparatus 20 are realized by execution of a control program according to the present embodiment by a processor serving as the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
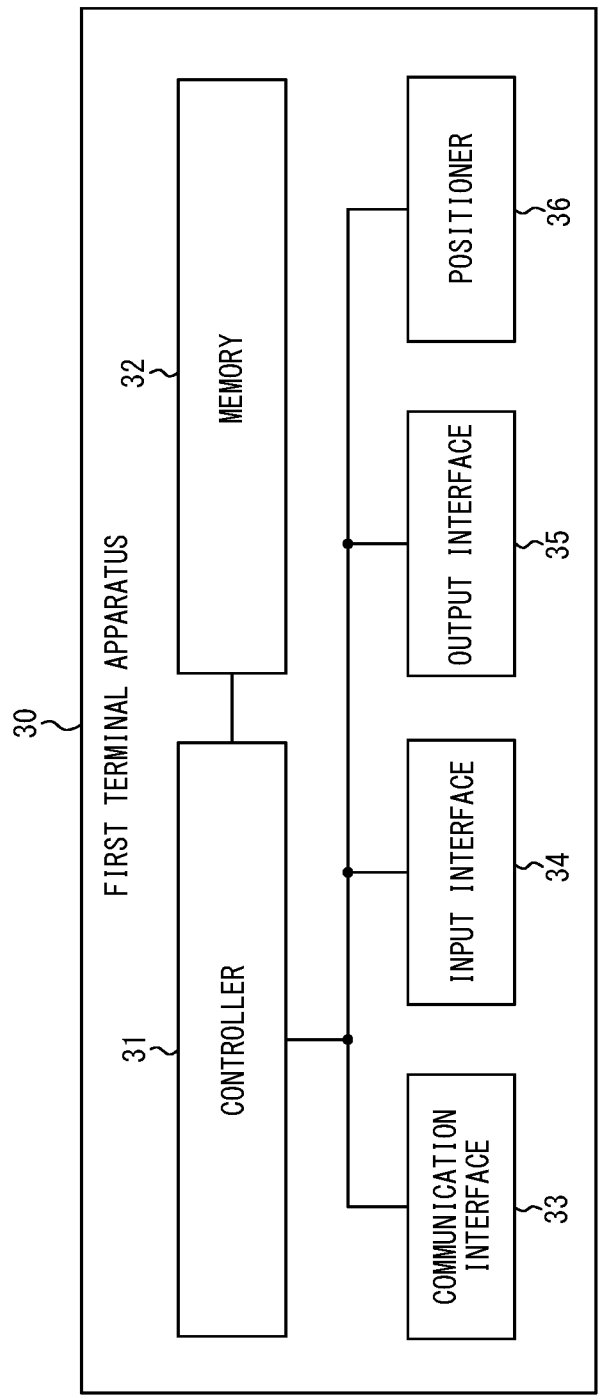
FIG. 3 is a block diagram illustrating a configuration of a first terminal apparatus according to the first embodiment of the present disclosure.

A configuration of the first terminal apparatus 30 according to the present embodiment will be described with reference to FIG. 3.

The first terminal apparatus 30 includes a controller 31, a memory 32, a communication interface 33, an input interface 34, an output interface 35, and a positioner 36.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the first terminal apparatus 30 while controlling components of the first terminal apparatus 30.

The memory 32 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth® (Bluetooth is a registered trademark in Japan, other countries, or both), or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, a camera, or a microphone. The input interface 34 accepts an operation for inputting data to be used for the operations of the first terminal apparatus 30. The input interface 34, instead of being included in the first terminal apparatus 30, may be connected to the first terminal apparatus 30 as an external input device. As an interface for connection, for example, an interface compliant with a standard such as USB, HDMI® (HDMI is a registered trademark in Japan, other countries, or both), or Bluetooth® can be used. The term "USB" is an abbreviation of Universal Serial Bus. The term "HDMI®" is an abbreviation of High-Definition Multimedia Interface.

The output interface 35 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 35 outputs data obtained by the operations of the first terminal apparatus 30. The output interface 35, instead of being included in the first terminal apparatus 30, may be connected to the first terminal apparatus 30 as an external output device. As an interface for connection, for example, an interface compliant with a standard such as USB, HDMI®, or Bluetooth® can be used.

The positioner 36 includes at least one GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLONASS" is an abbreviation of Global Navigation Satellite System. The positioner 36 measures the position of the first terminal apparatus 30.

The functions of the first terminal apparatus 30 are realized by execution of a terminal program according to the present embodiment by a processor serving as the controller 31. That is, the functions of the first terminal apparatus 30 are realized by software. The terminal program causes a computer to execute the operations of the first terminal apparatus 30, thereby causing the computer to function as the first terminal apparatus 30. That is, the computer executes the operations of the first terminal apparatus 30 in accordance with the terminal program to thereby function as the first terminal apparatus 30.

Some or all of the functions of the first terminal apparatus 30 may be realized by a programmable circuit or a dedicated circuit serving as the controller 31. That is, some or all of the functions of the first terminal apparatus 30 may be realized by hardware.

Figure 4:
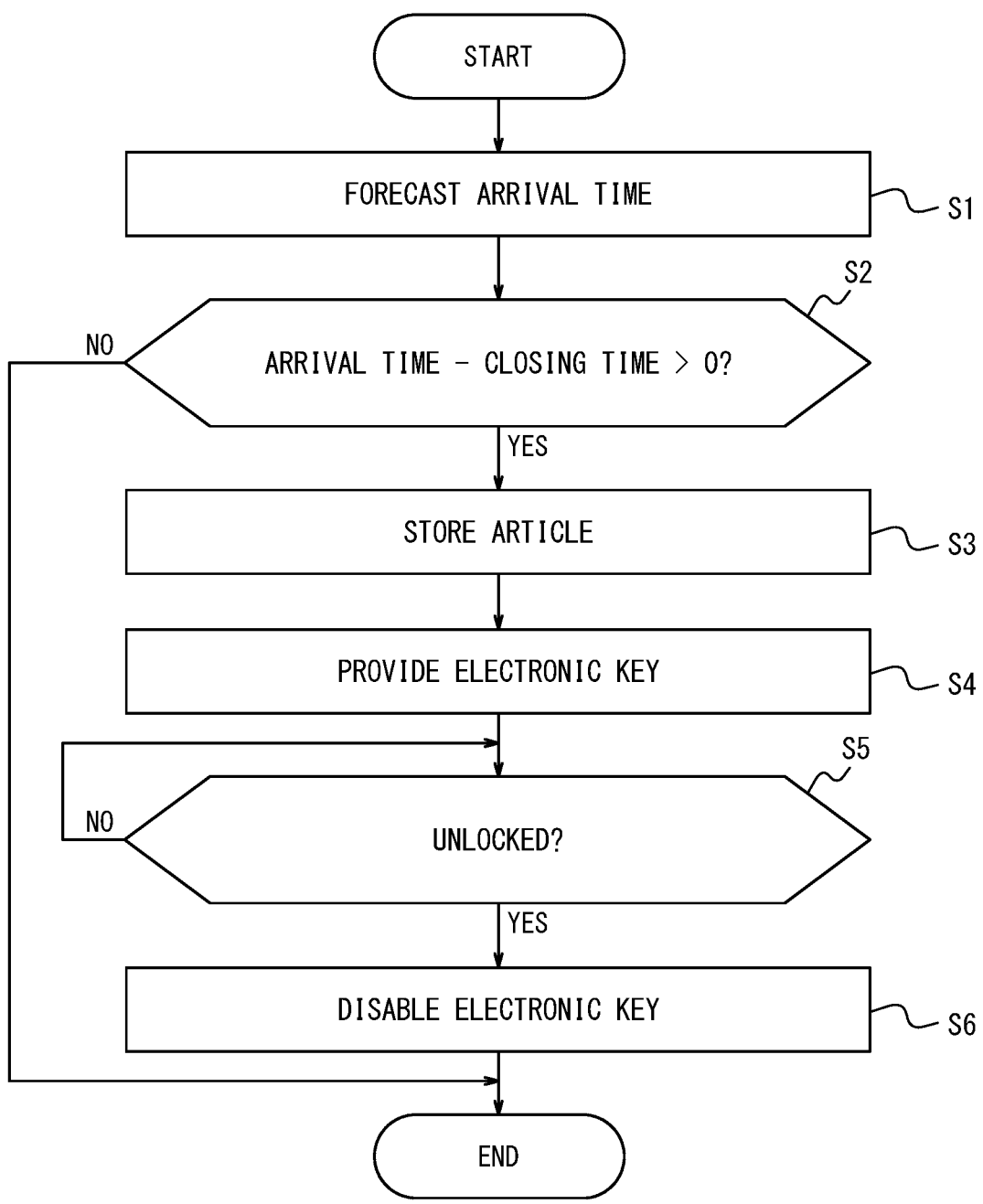
FIG. 4 is a flowchart illustrating operations of the system according to the first embodiment of the present disclosure.

Operations of the system 10 according to the present embodiment will be described with reference to FIG. 4. These operations correspond to a service provision method according to the present embodiment.

In step S1, the controller 21 of the control apparatus 20 forecasts an arrival time, a time at which the user 12 is to arrive at the store 13. This process may be executed in any procedure, but in the present embodiment, is executed in the following procedure.

The controller 31 of the first terminal apparatus 30 accepts an operation to order an article 11 from the user 12 via the input interface 34. The positioner 36 of the first terminal apparatus 30 measures the position of the first terminal apparatus 30 as the position of the user 12. The controller 31 controls the communication interface 33 to transmit order data D2 ordering the article 11 in response to the operation by the user 12, and positional data D3 indicating the position measured by the positioner 36. The communication interface 33 transmits the order data D2 and the positional data D3 to the control apparatus 20.

The communication interface 23 of the control apparatus 20 receives, from the first terminal apparatus 30, the order data D2 and the positional data D3 that are transmitted. The controller 21 of the control apparatus 20 acquires the order data D2 and the positional data D3 that are received by the communication interface 23. The controller 21 calculates, with reference to map data D4, the time required from the position indicated by the acquired positional data D3 to the store 13. The map data D4 may be stored in advance in the memory 22 of the control apparatus 20, or may be accumulated in an external system such as an Internet-based GIS. The term "GIS" is an abbreviation of geographic information system. The controller 21 may calculate the required time independently, or may calculate the required time using an external system such as an Internet-based GIS. The controller 21 forecasts the arrival time by adding the calculated required time to a current time.

In step S2, the controller 21 of the control apparatus 20 determines whether the arrival time forecasted in step S1 is later than a closing time for the store 13. That is, the controller 21 forecasts whether the user 12 is to arrive at the store 13 after a time slot for providing the article 11 at the store 13 has passed. The closing time may be stored in advance in the memory 22 of the control apparatus 20, or notification thereof may be sent from the second terminal apparatus 40. In a case in which the arrival time is the same as or earlier than the closing time, that is, in a case in which the user 12 is forecasted to arrive at the store 13 during the time slot for providing the article 11 at the store 13, the flow of FIG. 4 ends. In a case in which the arrival time is later than the closing time, that is, in a case in which the user 12 is forecasted to arrive at the store 13 after the time slot for providing the article 11 at the store 13 has passed, the process in step S3 is executed.

Instead of the closing time, an order acceptance cut-off time for the store 13 may be compared to the arrival time. That is, it may be forecasted whether the user 12 is to arrive at the store 13 after the time slot for providing the article 11 at the store 13 has passed, depending on whether the arrival time is later than the order acceptance cut-off time. In such a variation, in a case in which the arrival time is the same as or earlier than the order acceptance cut-off time, the flow of FIG. 4 ends. In a case in which the arrival time is later than the order acceptance cut-off time, the process in step S3 is executed.

In step S3, the controller 21 of the control apparatus 20 requests the clerk 14 of the store 13 to store the article 11 in the storage 50 and lock the storage 50, via the second terminal apparatus 40. This process may be executed in any procedure, but in the present embodiment, is executed in the following procedure.

Figure 5:
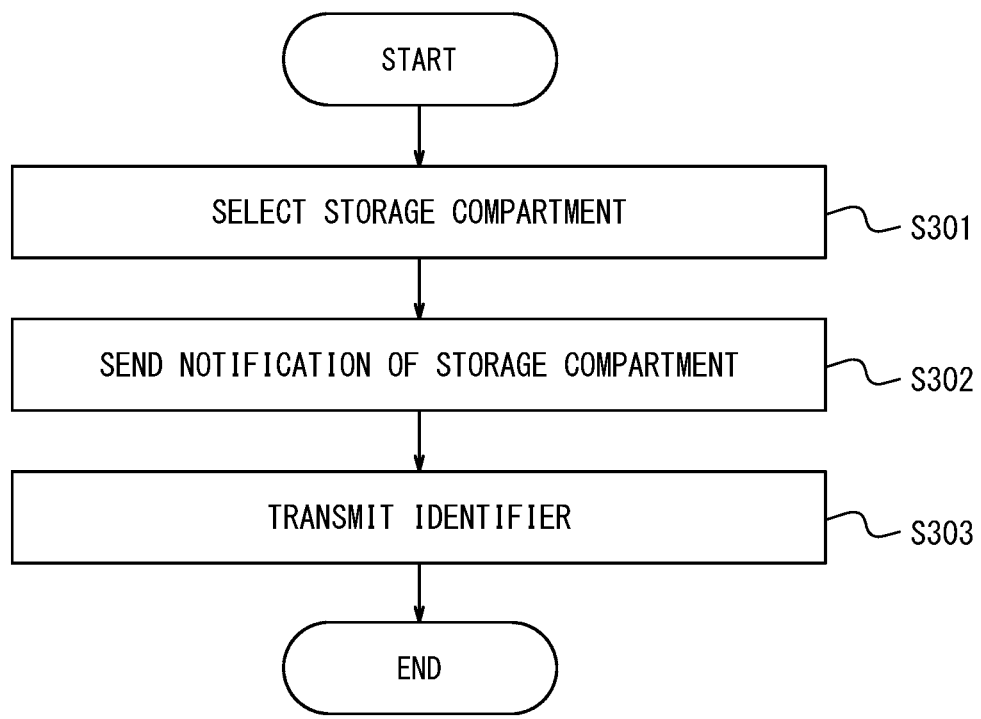
FIG. 5 is a flowchart illustrating operations of the control apparatus according to the first embodiment of the present disclosure.

As illustrated in FIG. 5, in step S301, the controller 21 of the control apparatus 20 selects a storage compartment 51 in which the article 11 is to be stored from among the two or more storage compartments 52 of the storage 50.

For example, suppose that the storage 50 is composed of three rows, having four storage compartments 52 in each row, as illustrated in FIG. 1. Suppose that numbers are assigned to the storage compartments 52 as their respective identifiers so as to increase by one from left to right and from top to bottom. Suppose that the fourth from the left in the top row, that is, the storage compartment 52 with the number "4" is available. In this case, the communication interface 23 of the control apparatus 20 receives, from the storage 50, status data D5 indicating that the storage compartment 52 with the number "4" is available. The controller 21 of the control apparatus 20 selects the storage compartment 52 with the number "4" as the storage compartment 51 in which the article 11 is to be stored, with reference to the status data D5 received by the communication interface 23.

The storage compartment 51 may be selected according to respective functions of the storage compartments 52 instead of or along with the availability of the storage 50. For example, suppose that the article 11 is a food product that requires environmental adjustment such as cold or heat retention. Suppose that the storage compartment 52 with the number "4" has a function of adjusting the environment. In this case, the communication interface 23 of the control apparatus 20 receives, from the storage 50, function data D6 indicating that the storage compartment 52 with the number "4" has a function of adjusting the environment. The controller 21 of the control apparatus 20 selects the storage compartment 52 with the number "4" as the storage compartment 51 in which the article 11 is to be stored, with reference to the function data D6 received by the communication interface 23.

In step S302, the controller 21 of the control apparatus 20 controls the communication interface 23 to transmit notification data D7 for notification of the storage compartment 51 selected in step S301. In the present embodiment, the notification data D7 includes data for notification of the article 11 ordered by the order data D2. The notification data D7 corresponds to data requesting that the article 11 be stored in the storage 50 and the storage 50 be locked. The communication interface 23 transmits the notification data D7 to the second terminal apparatus 40.

The second terminal apparatus 40 receives the transmitted notification data D7 from the control apparatus 20 via an interface compliant with a mobile communication standard such as LTE, the 4G standard, or the 5G standard. The second terminal apparatus 40 presents the received notification data D7 to the clerk 14. Specifically, the second terminal apparatus 40 displays, on a display such as an LCD or an organic EL display, a text message prompting to store the article 11 in the storage compartment 51 and lock the storage compartment 51. Alternatively, the second terminal apparatus 40 outputs, from a speaker, an audio message prompting to store the article 11 in the storage compartment 51 and lock the storage compartment 51.

When, by the clerk 14, the article 11 is stored in the storage compartment 51 and the storage compartment 51 is locked, in step S303, the communication interface 23 of the control apparatus 20 receives, from the storage 50, first report data D8 reporting that the storage compartment 51 is locked. When the first report data D8 is received by the communication interface 23, the controller 21 of the control apparatus 20 controls the communication interface 23 to transmit identification data D9 including the identifier of the storage compartment 51 selected in step S301. The identification data D9 is data for identifying the storage compartment 51 selected by the controller 21. The identification data D9 may include an image of the storage compartment 51 instead of or together with the identifier of the storage compartment 51. The image of the storage compartment 51 is, for example, a photograph obtained by imaging the front surface of the storage compartment 51 with a camera. The communication interface 23 transmits the identification data D9 to the first terminal apparatus 30.

The communication interface 33 of the first terminal apparatus 30 receives the transmitted identification data D9 from the control apparatus 20. The controller 31 stores the identification data D9 received by the communication interface 33 in the memory 32.

In step S4, the controller 21 of the control apparatus 20 provides the user 12 with an electronic key D1 for unlocking the storage 50. This process may be executed in any procedure, but in the present embodiment, is executed in the following procedure.

Figure 6:
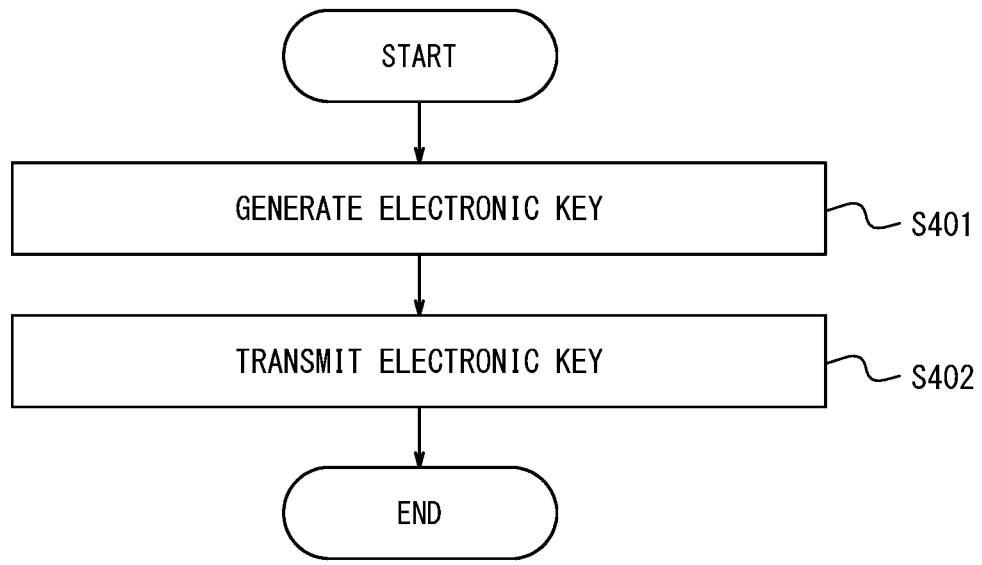
FIG. 6 is a flowchart illustrating operations of the control apparatus according to the first embodiment of the present disclosure.

As illustrated in FIG. 6, in step S401, the controller 21 of the control apparatus 20 generates, as the electronic key D1, a key for unlocking the storage compartment 51 selected in step S301. As the method for generating the key, any method may be used, but in the present embodiment, the same method is used as when virtual keys are generated in smart locks.

In step S402, the controller 21 of the control apparatus 20 controls the communication interface 23 to transmit the electronic key D1 generated in step S401. The communication interface 23 transmits the electronic key D1 to the first terminal apparatus 30.

The communication interface 33 of the first terminal apparatus 30 receives the transmitted electronic key D1 from the control apparatus 20. The controller 31 of the first terminal apparatus 30 stores the electronic key D1 received by the communication interface 33 in the memory 32.

In step S5, the controller 21 of the control apparatus 20 determines whether the storage 50 is unlocked. This process may be executed in any procedure, but in the present embodiment, is executed in the following procedure.

The controller 31 of the first terminal apparatus 30 accepts an operation to request guidance on the storage compartment 51, in which the article 11 is stored, from the user 12 via the input interface 34. The controller 31 acquires the identification data D9 from the memory 32 in response to the operation by the user 12. The controller 31 presents the acquired identification data D9 to the user 12 via the output interface 35. Specifically, the controller 31 displays the identifier or the image of the storage compartment 51 included in the identification data D9 on a display serving as the output interface 35. Alternatively, the controller 31 outputs the identifier of the storage compartment 51 included in the identification data D9 as audio from a speaker serving as the output interface 35. As a result, it is easy for the user 12 to identify the storage compartment 51 from among the two or more storage compartments 52.

When the first terminal apparatus 30 is held close to a common key-reading interface provided in the storage 50 or to an individual key-reading interface provided in the storage compartment 51 by the user 12, the controller 31 of the first terminal apparatus 30 acquires the electronic key D1 from the memory 32. In a case in which the key-reading interface is an interface compliant with a short-range wireless communication standard such as Bluetooth® or RFID, the controller 31 controls the communication interface 33 to transmit the acquired electronic key D1. The term "RFID" is an abbreviation of radio frequency identification. The communication interface 33 transmits the electronic key D1 to the key-reading interface. In a case in which the key-reading interface is a two-dimensional code reader, the controller 31 displays the electronic key D1 in the form of a two-dimensional code on a display serving as the output interface 35. As a result, the electronic key D1 is acquired by the storage 50 and the storage compartment 51 is unlocked.

When, by the user 12, the storage compartment 51 is unlocked using the electronic key D1 and the article 11 is picked up from the storage compartment 51, the communication interface 23 of the control apparatus 20 receives, from the storage 50, second report data D10 reporting that the storage compartment 51 is unlocked. When the second report data D10 is received by the communication interface 23, the controller 21 of the control apparatus 20 determines that the storage 50 is unlocked. The controller 21 determines that the storage 50 is not unlocked until the second report data D10 is received by the communication interface 23.

When the storage 50 is unlocked and the article 11 is picked up, in step S6, the controller 21 of the control apparatus 20 disables the electronic key D1. As the method for disabling the key, any method may be used, but in the present embodiment, the same method is used as when virtual keys are disabled in smart locks.

As described above, in the present embodiment, the controller 21 of the control apparatus 20 generates an electronic key D1 for unlocking the storage 50, which is to be locked with an article 11 stored therein. The communication interface 23 of the control apparatus 20 transmits the electronic key D1 generated by the controller 21 to the first terminal apparatus 30 of the user 12 in a case in which the user 12 is forecasted to arrive at the store 13 after a time slot for providing the article 11 at the store 13 has passed. Therefore, according to the present embodiment, it is possible to provide the article 11 to the user 12 even after the time slot for providing the article 11 at the store 13 has passed.

As a variation of the present embodiment, the two or more storage compartments 52 of the storage 50 may have different light-emitting modes from each other. Specifically, the corresponding lighting installed on the front surface of each storage compartment 52 may be designed to be unique in color, illumination shape, blinking pattern, or any combination thereof. A second embodiment, such a variation, will be described.

Figure 7:
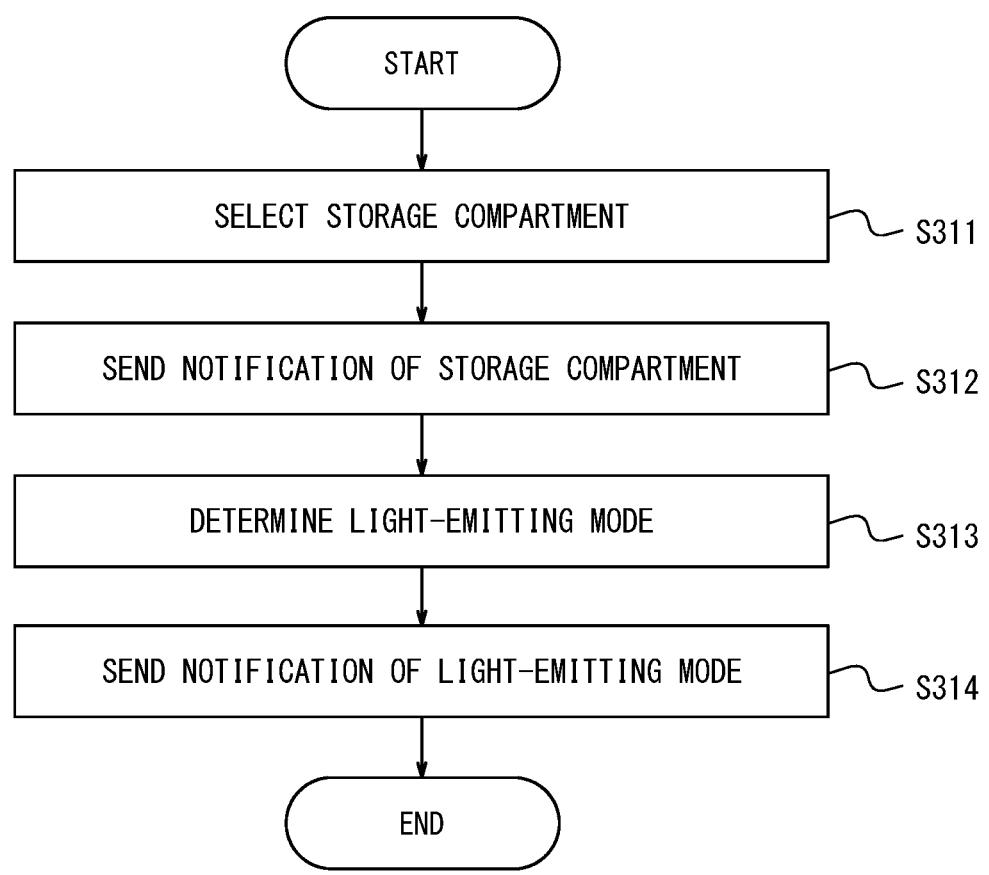
FIG. 7 is a flowchart illustrating operations of the control apparatus according to a second embodiment of the present disclosure.

In the present embodiment, the process in step S3 is different from that of the first embodiment. The procedure of the process in step S3 in the present embodiment will be described with reference to FIG. 7.

The processes in step S311 and step S312 are the same as the processes in step S301 and step S302, and thus descriptions thereof are omitted.

When, by the clerk 14, the article 11 is stored in the storage compartment 51 and the storage compartment 51 is locked, in step S313, the communication interface 23 of the control apparatus 20 receives, from the storage 50, first report data D8 reporting that the storage compartment 51 is locked. When the first report data D8 is received by the communication interface 23, the controller 21 of the control apparatus 20 determines a light-emitting mode of the storage compartment 51 selected in step S311. Specifically, the controller 21 determines a color, a illumination shape, or a blinking pattern of the lighting installed on the front surface of the storage compartment 51.

In step S314, the controller 21 of the control apparatus 20 controls the communication interface 23 to transmit identification data D9 that includes data indicating the light-emitting mode determined in step S313. The identification data D9 corresponds to data for notification of a light-emitting mode of the storage compartment 51. The identification data D9 may include the identifier or an image of the storage compartment 51 together with the data indicating the light-emitting mode of the storage compartment 51. The communication interface 23 transmits the identification data D9 to the first terminal apparatus 30.

The communication interface 33 of the first terminal apparatus 30 receives the transmitted identification data D9 from the control apparatus 20. The controller 31 stores the identification data D9 received by the communication interface 33 in the memory 32.

In the present embodiment, after the process in step S4 and before the process in step S5, the following process is executed.

Figure 8:
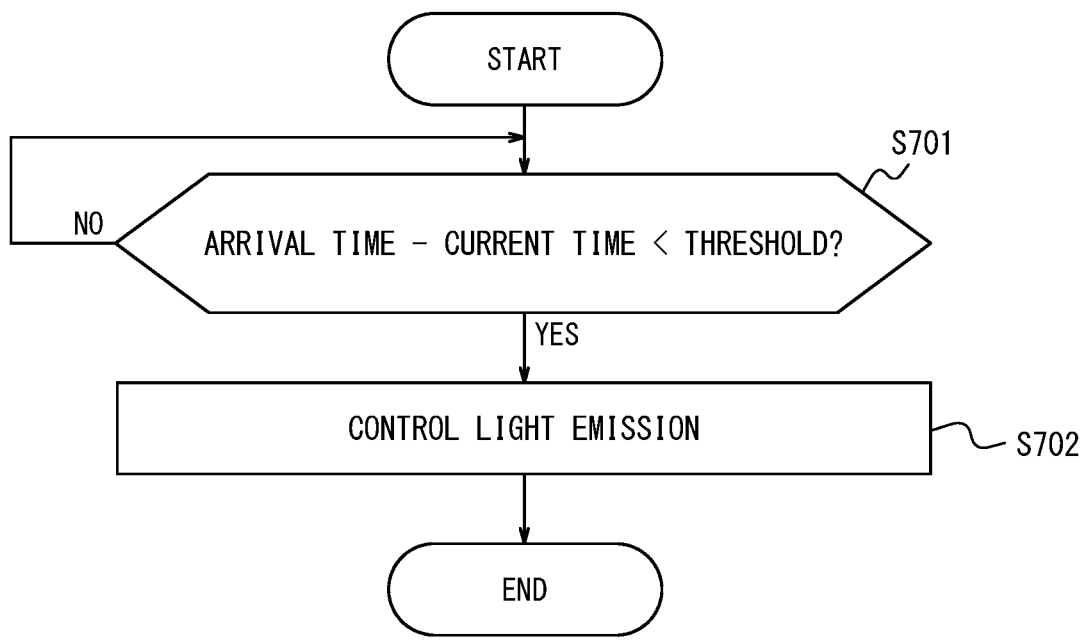
FIG. 8 is a flowchart illustrating operations of the control apparatus according to the second embodiment of the present disclosure.

As illustrated in FIG. 8, in step S701, the controller 21 of the control apparatus 20 determines whether the remaining time until the arrival time forecasted in step S1 is less than a threshold. The threshold may be set to any value such as one minute. In a case in which the remaining time until the arrival time is equal to or greater than the threshold, the process in step S701 is executed again. In a case in which the remaining time until the arrival time is less than the threshold, the process in step S702 is executed.

In step S702, the controller 21 of the control apparatus 20 controls the storage compartment 51 selected in step S311 to emit light in the light-emitting mode determined in step S313. Specifically, the controller 21 controls the lighting installed on the front surface of the storage compartment 51 so that the color, the illumination shape, or the blinking pattern of the lighting is the same as that determined.

The controller 31 of the first terminal apparatus 30 acquires the identification data D9 from the memory 32 upon accepting an operation to request guidance on the storage compartment 51, in which the article 11 is stored, from the user 12, as in the first embodiment. The controller 31 presents the acquired identification data D9 to the user 12 via the output interface 35. Specifically, the controller 31 displays, on a display serving as the output interface 35, the data indicating the color, the illumination shape, or the blinking pattern of the lighting installed on the front surface of the storage compartment 51, included in the identification data D9. As a result, it is possible for the user 12 to instantly identify the storage compartment 51 from among the two or more storage compartments 52.

Instead of the remaining time until the arrival time, the distance from the position of the user 12 to the store 13 may be compared to a threshold. Such a variation will be described.

Figure 9:
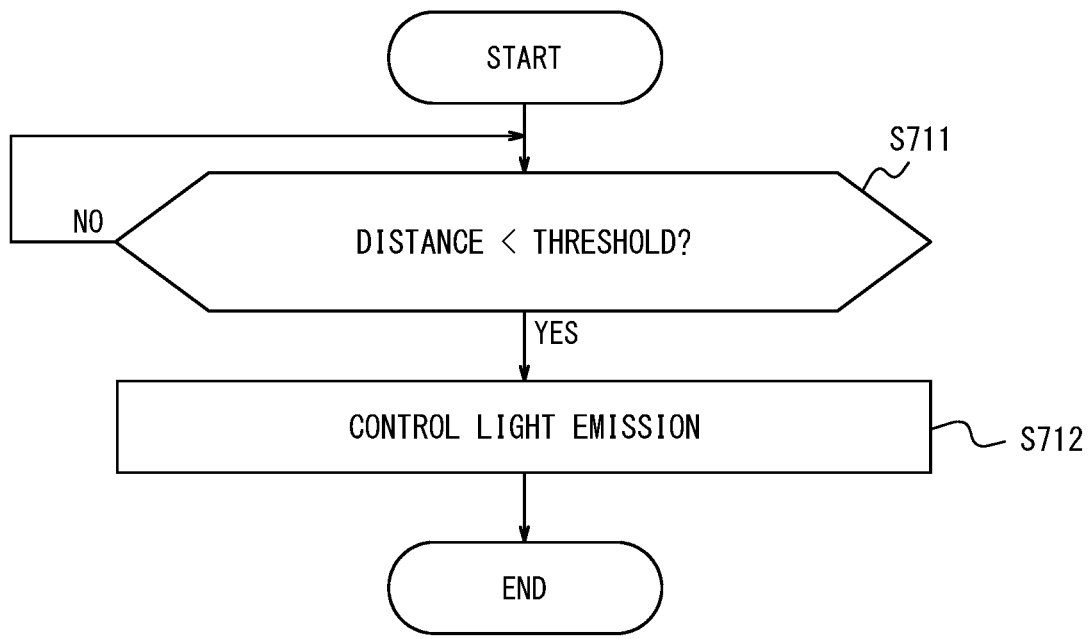
FIG. 9 is a flowchart illustrating operations of the control apparatus according to a variation of the second embodiment of the present disclosure.

As illustrated in FIG. 9, in step S711, the communication interface 23 of the control apparatus 20 receives positional data D3 indicating the position of the first terminal apparatus 30 as the position of the user 12 from the first terminal apparatus 30. The controller 21 of the control apparatus 20 acquires the positional data D3 received by the communication interface 23. The controller 21 calculates, with reference to the map data D4, the distance from the position indicated by the acquired positional data D3 to the store 13. The controller 21 may calculate the distance independently, or may calculate the distance using an external system such as an Internet-based GIS. The controller 21 determines whether the calculated distance is less than a threshold. The threshold may be set to any value such as 100 meters. In a case in which the distance is equal to or greater than the threshold, the process in step S711 is executed again. In a case in which the distance is less than the threshold, the process in step S712 is executed.

Instead of the distance, the required time may be compared to a threshold. The threshold may be set to any value such as one minute.

The process in step S712 is the same as the process in step S702, and thus a description thereof is omitted.

As described above, in the present embodiment, the controller 21 of the control apparatus 20 controls a selected storage compartment 51 to emit light in a determined light-emitting mode in time for arrival of the user 12 at the store 13. Therefore, according to the present embodiment, it is possible for the user 12 to instantly identify the storage compartment 51 upon arrival at the store 13.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

For example, the control apparatus 20 may be included in the storage 50. In that case, some of the operations of the storage 50 may be performed by the control apparatus 20.

The invention claimed is:

1. A control apparatus comprising:
   a controller configured to generate an electronic key for unlocking a storage configured to be locked with an article stored therein; and
   a communication interface configured to transmit the electronic key generated by the controller to a terminal apparatus of a user in a case in which the user is forecasted to arrive at a store after a time slot for providing the article at the store has passed.

2. The control apparatus according to claim 1, wherein
   the storage has two or more storage compartments configured to be locked individually, and
   the controller is configured to select a storage compartment in which the article is to be stored from among the two or more storage compartments in the case in which the user is forecasted to arrive at the store after the time slot has passed, and generate a key for unlocking the selected storage compartment as the electronic key.

3. The control apparatus according to claim 2, wherein the communication interface further transmits identification data for identifying the storage compartment selected by the controller to the terminal apparatus of the user in the case in which the user is forecasted to arrive at the store after the time slot has passed.

4. The control apparatus according to claim 3, wherein the identification data includes an identifier of the storage compartment selected by the controller.

5. The control apparatus according to claim 3, wherein
   the two or more storage compartments have different appearances from each other, and
   the identification data includes an image of the storage compartment selected by the controller.

6. The control apparatus according to claim 3, wherein
   the two or more storage compartments have different light-emitting modes from each other, and
   the identification data includes data indicating a light-emitting mode of the storage compartment selected by the controller.

7. The control apparatus according to claim 3, wherein
   the two or more storage compartments have a function of emitting light individually, and
   in a case in which the storage compartment in which the article is to be stored is selected, the controller determines a light-emitting mode of the selected storage compartment, includes data indicating the determined light-emitting mode in the identification data, and controls the selected storage compartment to emit light in the determined light-emitting mode in time for arrival of the user at the store.

8. The control apparatus according to claim 2, wherein the communication interface transmits notification data for notification of the storage compartment selected by the controller to a terminal apparatus of the store in the case in which the user is forecasted to arrive at the store after the time slot has passed.

9. The control apparatus according to claim 1, wherein the controller disables the electronic key when the storage is unlocked and the article is picked up.

10. The control apparatus according to claim 1, wherein the controller is configured to forecast a time at which the user is to arrive at the store, and control the communication interface to transmit the electronic key in a case in which the forecasted time is later than a closing time or an order acceptance cut-off time for the store.

11. A system comprising:
the control apparatus according to claim 1; and
the storage.

12. The system according to claim 11, further comprising the terminal apparatus of the user.

13. A storage comprising the control apparatus according to claim 1.

14. A service provision method comprising:
generating, by a control apparatus, an electronic key for unlocking a storage configured to be locked with an article stored therein; and
transmitting the generated electronic key from the control apparatus to a terminal apparatus of a user in a case in which the user is forecasted to arrive at a store after a time slot for providing the article at the store has passed.

15. The service provision method according to claim 14, wherein
the storage has two or more storage compartments configured to be locked individually,
the service provision method further comprising selecting, by the control apparatus, a storage compartment in which the article is to be stored from among the two or more storage compartments in the case in which the user is forecasted to arrive at the store after the time slot has passed,
wherein the generating includes generating a key for unlocking the selected storage compartment as the electronic key.

16. The service provision method according to claim 15, wherein the transmitting includes further transmitting identification data for identifying the selected storage compartment to the terminal apparatus of the user.

17. The service provision method according to claim 16, wherein the identification data includes an identifier of the selected storage compartment.

18. The service provision method according to claim 16, wherein
the two or more storage compartments have different appearances from each other, and
the identification data includes an image of the selected storage compartment.

19. The service provision method according to claim 16, wherein
the two or more storage compartments have different light-emitting modes from each other, and
the identification data includes data indicating a light-emitting mode of the selected storage compartment.

20. The service provision method according to claim 16, wherein
the two or more storage compartments have a function of emitting light individually, and
the selecting includes determining a light-emitting mode of the selected storage compartment, including data indicating the determined light-emitting mode in the identification data, and controlling the selected storage compartment to emit light in the determined light-emitting mode in time for arrival of the user at the store.

* * * * *